Sept. 27, 1960     C. MANKOUSKI     2,954,458
HOLDER FOR WELDING RODS
Filed July 17, 1958     4 Sheets-Sheet 1

INVENTOR
Charles Mankouski

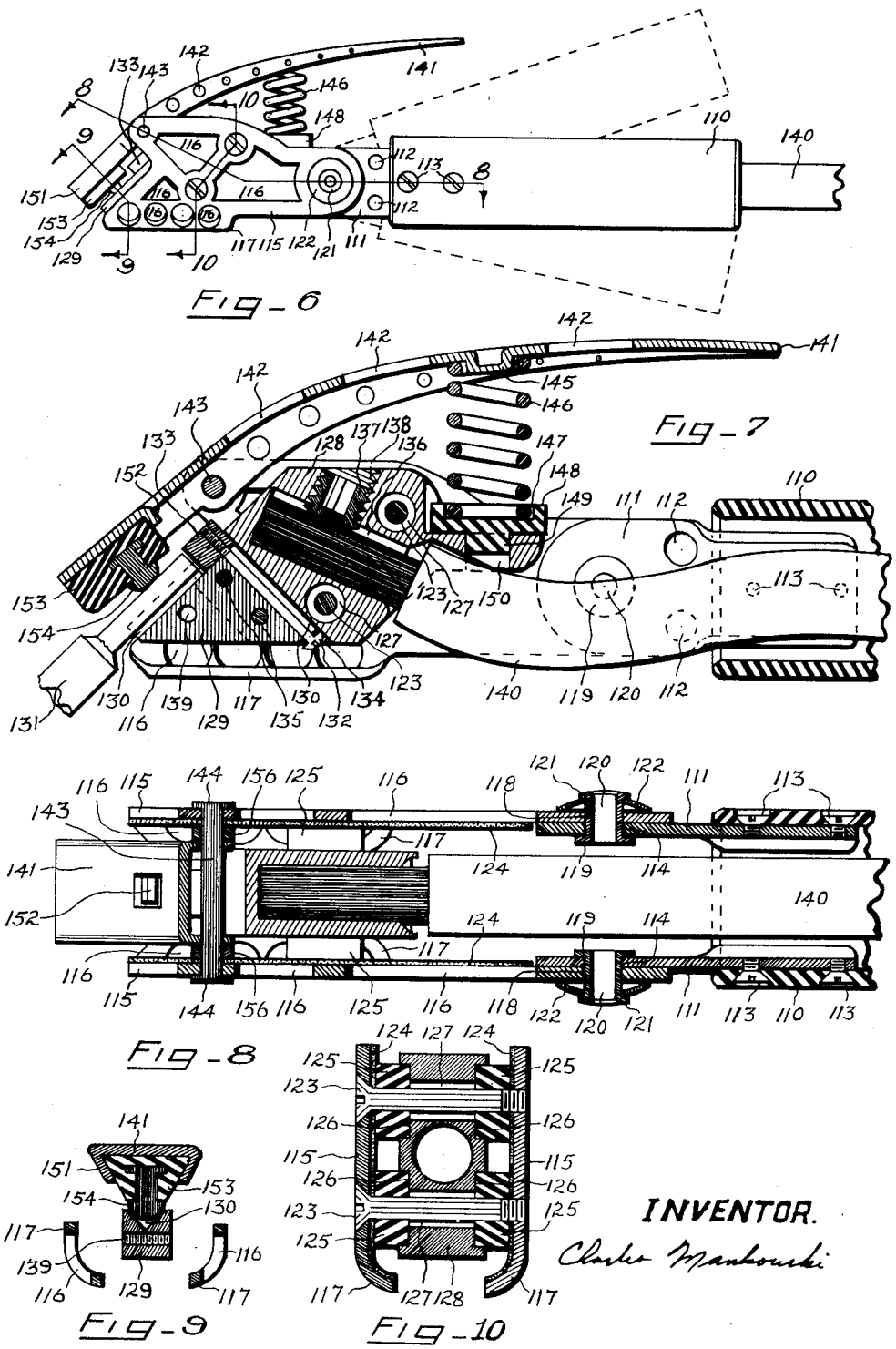

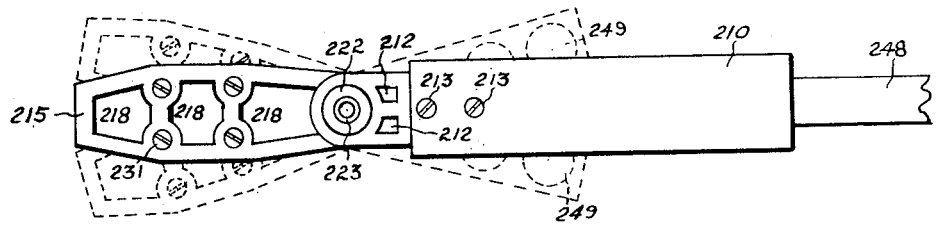
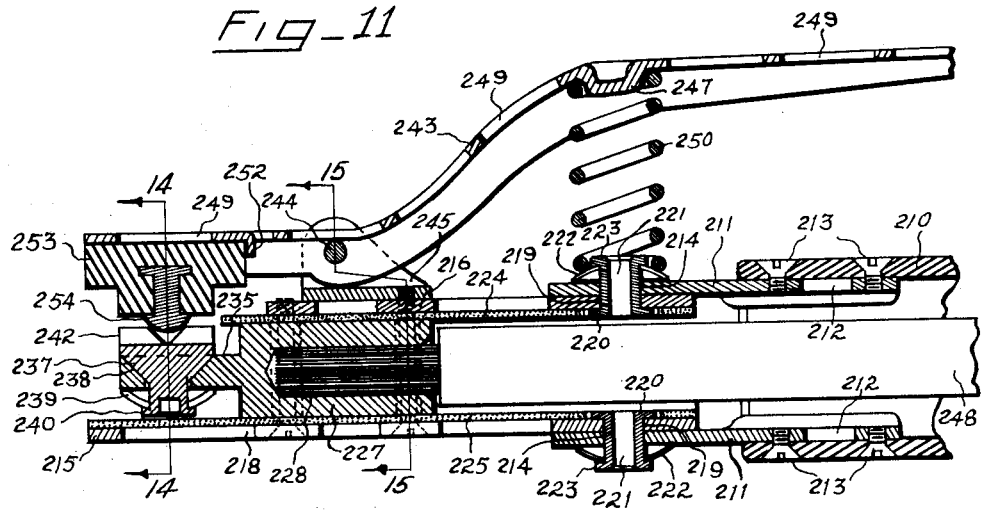
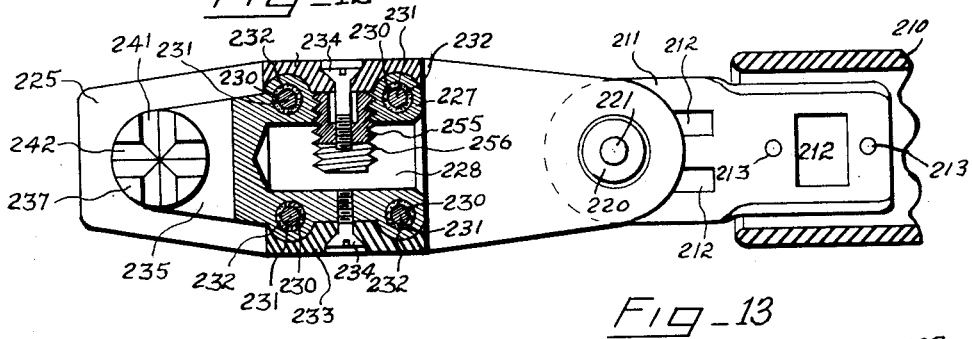
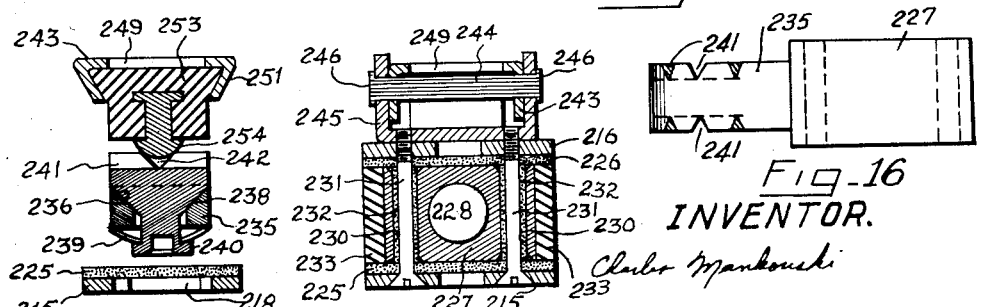

Sept. 27, 1960 C. MANKOUSKI 2,954,458
HOLDER FOR WELDING RODS
Filed July 17, 1958 4 Sheets-Sheet 4
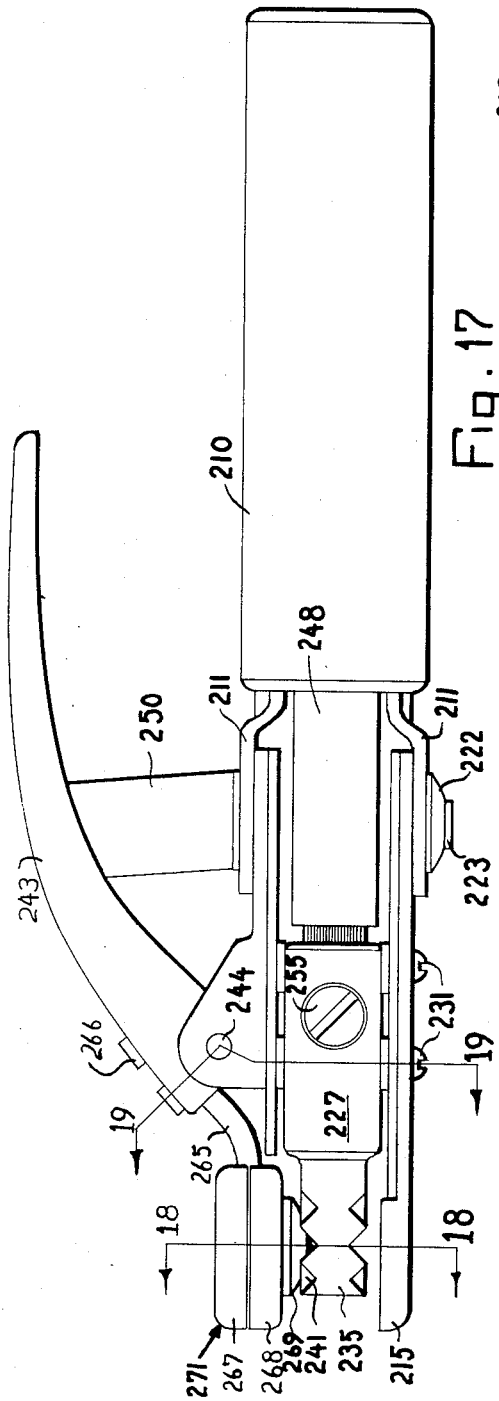
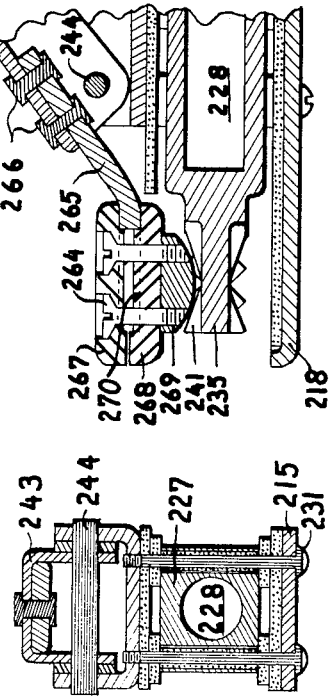
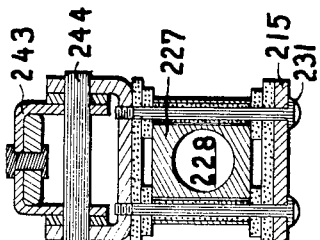
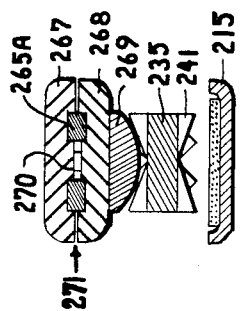
INVENTOR
Charles Mankouski
BY JOHN P. MURPHY
ATTORNEY

United States Patent Office 2,954,458
Patented Sept. 27, 1960

2,954,458

HOLDER FOR WELDING RODS

Charles Mankouski, P.O. Box 332, Middleville, N.Y.

Filed July 17, 1958, Ser. No. 750,846

16 Claims. (Cl. 219—138)

This invention relates to electric arc welding, and more particularly to improvements in welding rod holders. This invention is a continuation-in-part of my applications Serial Numbers 247,163 filed September 18, 1951, 594,599, filed June 28, 1956; 678,674, filed August 16, 1957; and 678,675, filed August 16, 1957, for holders for welding rods, now all abandoned.

Several forms of welding rod holders have been presented in the past. However, certain disadvantages have become apparent during the operation of the different types. Among the disadvantages is the problem of overheating of the welding rod holder, which is a fault in design. Another disadvantage is the lack of adjustment means providing for the changing of the angle of the welding rod to the work. Under certain conditions, inaccessibility of the work requires special bending of the welding rod which constitutes a loss in time, danger to the operator, and a waste of welding rods. Yet another disadvantage inherent in many types of holders is the fatigue caused to the operator over long periods of operation. This is due to weight, and most important—lack of proper design and convenience features. A further disadvantage of previous types of welding rod holders is that loss of usage of the holder, and loss of operator time is frequently the result of parts of the holder becoming worn out or burned out. This necessitates costly replacement of component parts of the holders.

It is therefore a prime object of the present invention to provide a welding rod holder having a forward head assembly that is provided with means to vary the angle of the welding rod in two independent ways.

Another object of this invention is to provide a well insulated welding rod holder that also provides for the restriction of the heat conducting and current conducting members to a minimum number, thus maintaining the holder at a comfortable, cool temperature during long periods of operation.

Another object of this invention is to provide a holder that provides for the connecting of the current conducting cable in a manner so as to prevent damage to the cable and at the same time be convenient to the operator, thus avoiding fatigue during long periods of operation.

A further object of the present invention is to provide for the replacement of component parts or renewal of parts of the holder at a minimum of time and expense.

A still further object is to extend the life of a holder for electrodes beyond the normally expected life of previous types.

In carrying out the objects of the invention, there is provided a holder for electrodes consisting of a head assembly for holding the electrode, a handle, a hinge joint for connecting the head assembly with the handle, the head being adapted to tilt with respect to the handle, and means for connecting an electric cable to the head assembly whereby the cable travels past the hinge joint, means for varying the angle of the welding rod with respect to the work, and means providing for the replacement of renewal of parts of the holder.

In the drawings:

Figure 6 is a plan view of another embodiment of the invention.

Figure 7 is a sectional view of the invention in part.

Figure 8 is a sectional view taken along the line 8—8 in Figure 6.

Figure 9 is a sectional view taken along the line 9—9 in Figure 6.

Figure 10 is a sectional view taken along the line 10—10 in Figure 6.

Figure 11 is a plan view of another embodiment of the invention.

Figure 12 is a longitudinal sectional view of the further embodiment, taken from either the top or bottom thereof.

Figure 13 is a longitudinal sectional view of the embodiment.

Figure 14 is a sectional view taken along line 14—14 in Figure 12.

Figure 15 is a sectional view taken along line 15—15 in Figure 12.

Figure 16 is a side elevational view of a modified portion of the embodiment according to Figure 11.

Figure 17 is a top or bottom plan view of a modification of the invention.

Figure 18 is a sectional view taken along line 18—18 in Figure 17.

Figure 19 is a sectional view taken along line 19—19 in Figure 17.

Figure 20 is a longitudinal sectional view of the invention, in part, according to the embodiment shown in Figure 17.

Figure 1:
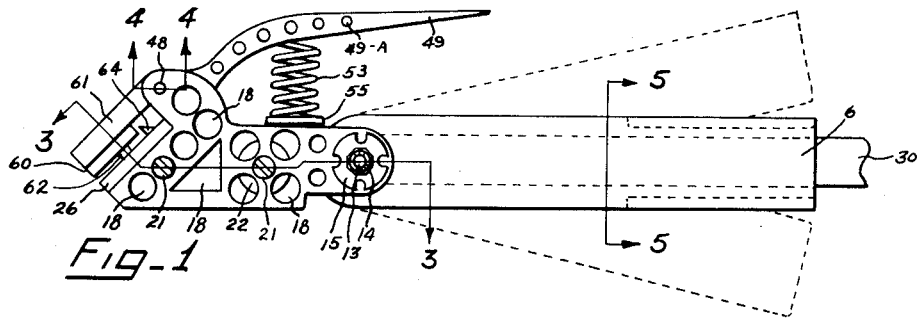
Figure 1 is a side view of one modification of the invention.
Figure 2:
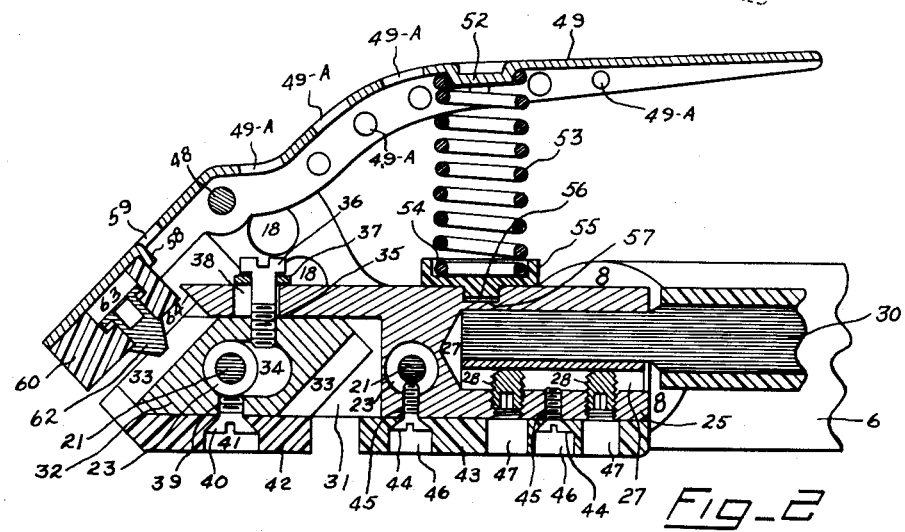
Figure 2 is a longitudinal sectional view of an embodiment of the invention.
Figure 3:
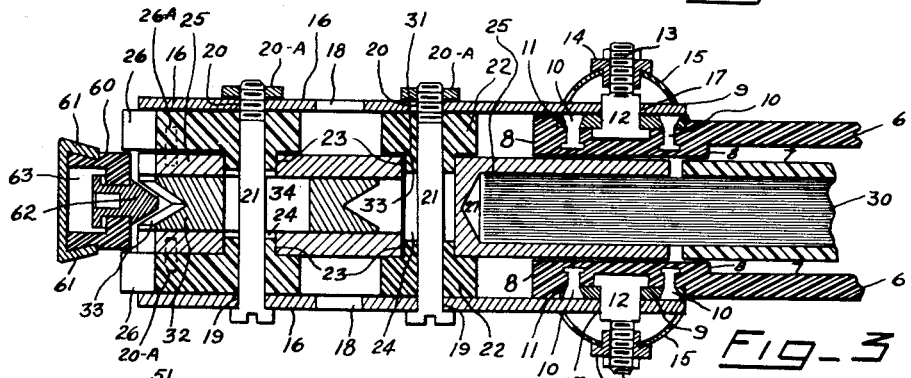
Figure 3 is a sectional view taken along line 3—3 in Fig. 1.
Figures 4, 5:
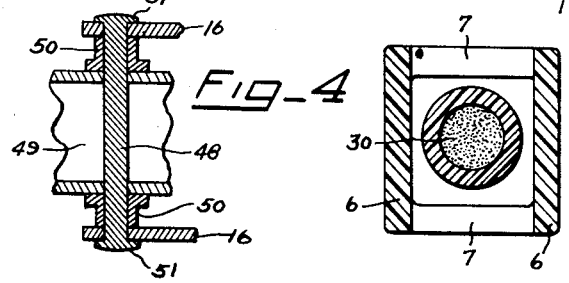
Figure 4 is a sectional view taken along line 4—4 in Fig. 1.
Figure 5 is a transverse section taken along the line 5—5 in Figure 1.

Several embodiments are illustrated in the drawings. First, the modification as illustrated in Figures 1 to 5 will be discussed.

Referring in detail to the drawing, there is shown a welding rod holder having a gripping handle 6, which may be hollow or tubular in form, a tubular one being shown. A slotted opening 7 forms two sides in the form of flat yokelike extensions, to provide space for the free movement of a welding cable normally placed therein, as will appear. The extensions have increased thickness portions 8, for more positive insulation, and have recesses 11 formed therein.

The forward end of the welding rod holder has metallic side plates 16 extending backwardly to the extensions of the gripping handle 6. A hinge joint is formed connecting the plates 16 and the handle 6. Metallic disc plates 9 are riveted, or preferably molded in place securely in the recess 11, rivets 10 being shown. The disc plates 9 have a means for accommodating a threaded stud 12 which is not permitted to rotate on the disc plates 9, due to tension adjusting reasons, as will appear. The studs 12 may be therefore press-fitted, welded, or even made an integral part of the disc plates 9 for this reason. The stud 12 is provided with a shaft section projecting outward through the center of the disc plate 9, and is provided with a portion of reduced diameter, and is threaded as at 13 to engage self locking nuts 14, which are arranged to control the adjustment of tension of the hinge joint. This control of tension is accomplished by the use of spring washers, which may be in the form of cupped metal spring washers 15, that operate and rotate on the reduced diameter portion of self locking nut 14, and under a portion of the self locking nut 14, for reasons of alignment and centering. The cupped metallic spring washer 15 is interposed between self locking nut 14 and metallic side plate 16, which plates 16 are mounted to rotate on shaft portions of the studs 12, and in operation form the hinge joint. Thus it is seen that the adjustable self locking nuts form means to adjust so as to increase or decrease the tension applied on the hinge joint. The gripping handle 6, and associated assembly of parts 9, 10, 12, 13, 14 and 15 comprises the first hinge portion, and the metallic side plates 16, interposed between the washer 15 and nut 14, forms the second portion of the hinge joint.

The metallic side plates are arranged substantially parallel and are provided with drilled or stamped cooling and lightening holes 18 therein, which are positioned forward of the hinge joint. Also formed forward of the hinge joint are mounting holes 19, and threaded holes 20. The threaded holes 20 may be formed at an increased thickness portion, or may be formed by threaded washers secured to the plates 16.

A metallic current conducting body 25 is positioned between the metallic side plates 16. Cylindrical insulation blocks 22 have a reduced diameter portion 23 which is fitted into hole 24 in the body 25 for mounting the body 25 between the side plates 16. Machine screws 21 are arranged transversely through the side plates 16 and to mount the insulation blocks 22 for fastening them to the plates 16. The insulation blocks 22 also serve to align, space, and insulate the side plates from the body 25.

The forward insulation blocks 26 are shaped differently with respect to blocks 22 to insure greater insulation than the rear blocks 22. The main difference in shaping being in the spacing portion which is larger and extends forwardly past the side plates 16 at an angle (here shown as 45°) and is substantially flush with the bottom to provide more insulation protection due to being closer to the welding arc during operation of the holder.

The current conducting body 25 may be formed of lightweight formed or diecast material such as aluminum, or any other efficient conductor of electricity. The body 25 is provided to accommodate a welding current cable by means of hole or bore 27 formed therein, and is provided with a set screw or screws 28 threadably secured in the body 25 to retain the end of a welding cable therein. A plate 29 may be interposed between the screws 28 and the welding cable or conductor 30 to aid in clamping the cable in the bore 27.

The forward portion of the current conducting body 25 is provided with a recess 31, forming a chamber for accommodating a double-ended welding rod jaw 32, which is preferably formed of a copper alloy or the like for maximum conductivity and long wear. The jaw is arranged so as to be angular at each of its ends. The angle is shown herein as being substantially 45°, and each groove 33 at the ends of the jaw is formed along the angular portion. However, the angle itself is not critical, and may be more or less than the angle shown. The rod receiving groove 33 may be any V-shaped groove of convenient size as to permit the placing of an electrode or welding rod therein. A large opening 34 is formed in the jaw 32 to provide clearance for the screw 21, and prevent current contact with the screw 21. Insulation of the side plates 16 is thus preserved. A machine screw 36 and washer 37 operate through longitudinal slot 38 on the body 25 to permit the adjusting of the jaw 32 forwardly and backwardly to compensate for wear. It will become obvious that the jaw 32 and V-groove 33 may in this manner be renewed at both ends when worn, to provide a jaw 32 of double life. The rod gripping jaw 32 is also threaded as at 39 to accommodate screw 40, operating in hole and recess 41 in base insulation block 42. Another insulation block 43 is secured by machine screws 44 in threaded holes 45 in the underside of current conducting body 25. The blocks serve to protect and insulate the base portion. An additional feature of the screws 44 operating in recess 46 and holes is to provide for enabling the operator to tighten or secure the welding cable set screws 28 without removing the base insulation 43.

An upwardly extended portion of the side plates 16 houses a welding rod clamping handle 49 by providing a mounting means for a shaft 48 which is fitted transversely through the metallic side plates 16 and through spacing and bearing collars 50 that are fastened to the rod clamping handle 49. The collars 50 act as spacers and provide bearing area to operate on shaft 48 when the shaft is fitted through the handle 49. The shaft 48 may be peened at its ends to prevent its being moved out of the plates 16. The handle 49 is thus pivotally mounted on side plates 16, or may be described as being hingedly mounted by means of the hinge shaft 48. The handle 49 is arranged longitudinally, and extended over and within the forward portion, and also beyond the current conducting body 25. The clamping handle 49 also has lightening and cooling holes 49-A. A channel shaped underside portion is formed from beyond the hinge shaft portion at 48 toward the back end. A formed projection 52 is formed to retain a compression spring 53, which is adapted to exert force between the underside of the rod clamping handle 49 and the recess 54 of the spring insulation part 55 which is arranged on the top and rear portion of the current conducting metallic body 25. Spring force keeps the spring insulation 55 in place in hole 57. The spring force outwardly against the end of the clamping handle 49 in turn exerts an inward movement of the forward end of the handle 49 against the rod gripping jaw 32.

A forward portion 61 of the handle 49 is dovetailed, and receives and holds a dovetailed shaped insulation block 60 therein. A pressed out section of metal 58, leaving hole 59 acts as a stop for the insulation block 60. The block 60 is provided with a tapered conical stud 62 riveted in the recess 63 of the insulation block 60. The block and stud provide means for applying pressure against a rod placed in the V groove 33 of the gripping jaw 32. The stud 62, being embedded in the insulation block 60, prevents any current from traveling to the clamping handle 49.

A rod stop 64 is formed on the top portion of the current conducting body 25, and prevents the operator from pushing a rod too far into the groove 33 so as to strike the insulated parts of the holder.

In operating the welding rod holder, the operator grasps the holder in one hand. Thumb pressure applied downwardly on the rod clamping handle 49 will move the stud 62 away from the groove 33 in the jaw 32, permitting the operator to place a welding rod in the V groove 33. The thumb pressure is released, and the spring 53 exerts force to close the stud 62 against the rod located in the V groove 33 to hold the rod securely therein. Current will then pass from the cable through the body 25, jaw 32 to the rod therein.

When it is desired to hold the welding rod at an angle different than the angle at any time, it is necessary only to tilt the forward rod receiving hinged head assembly up or down. The head assembly will rotate on the studs 12 to tilt either side of the handle. The cupped spring or the like washers 15 provide means to exert tension on the hinge joint against the washers, which tension must be adjusted to the degree where thumb pressure on the handle 49 will not vary the angle of the head assembly by leverage. As the head is tilted up or down, any set angle will remain set due to friction by the pre-adjustable tensioned hinge joint, which maintains its proper friction during consistent use of the holder.

It is seen that the current conducting body 25 and the jaw 32 are the only welding current conducting means in the holder for electrodes. It is further seen that the welding cable travels through the handle, past the hinge joint, and is attached to the forward hinged head assembly. Damage to the welding cable due to excessive bending when changing the angle of the head assembly is thus reduced to a minimum. Maximum cooling of the holder is afforded by the cooling holes in the side plates and rod clamping handle, and for the reason that the current conducting body is insulated from, and suspended between the side plates. It will also become obvious that cooling is afforded inasmuch as the cable is connected directly to the head assembly, thus preventing any conductivity of heat to the handle 6 of the holder.

Another modification of the holder for electrodes is shown in detail in Figures 6 to 10 inclusive. In this modification, a gripping handle 110 has one of its ends provided with a pair of parallel arranged extension plates 111, which may be formed from stamped steel or the like, and provided with cooling holes 112. The plates 111 are attached to the handle 110 by means of screws 113 or may also be attached by means of rivets. The sides of the plates 111 are formed so as to have a flat appearance, and are also provided with reamed holes 114 for mounting the hinge joint.

The forward hinge portion of this embodiment comprises the parallel arranged metallic housing plates 115, which are provided with openings 116 for lightening and cooling. A formed portion 117 serves as a guard for the base of the holder. The rearward rounded ends of the plates 115 have formed therein reamed holes 118, and the rounded ends overlap adjacent the extension plates 111. A flanged axle 119 is provided and has a hollow portion 120. The axle 119 passes through the holes 114 and 118, mounting the plates 111 and 115 together, and forming the parallel hinge joint. Cupped spring washers 122 are arranged to mount on the outer sides of the hinge joint. The ends of the axle 119 are peened over as at 121 to form a flange over the cupped spring washers 122 for compressing the washers to any desired tension. The tension may be increased by additional peening of the ends 121 of the axles 119. Any expansion or contraction of the components of the hinge joint during welding operation will be compensated for by the spring washer 122 at each side of the joint, providing a constant spring tension on the double hinge joint.

The parallel arranged housing plates 115 form a housing to contain flexible insulation strips 124, which may be required only during unusual and extreme welding conditions as a safety factor to prevent shorts that could occur from excessive welding spatter. A current conducting metallic body 128 is suspended or mounted on insulation bushings 125 arranged in the recessed holes 126 of the body 128, and through which bolts 123 are adapted to be engaged. Smaller holes 127 extend through the body 128 and join the larger holes 126 as recesses for insulation for the bolts 123 which mount and clamp securely the body 128 between the housing plates 115.

The current conducting body 128 comprises the means for accommodating at an angle, and in a recess, a double-wearing, reversible, triangular headed jaw 129. The jaw 129 is provided with a V groove 130 on two of its angles. The jaw 129 is further characterized in that it is mounted at an angle in the recess, due to the recess being formed angularly in the conducting body 128. With the jaw 129 mounted in the body 128, one groove 130 is adapted to receive a welding rod 131 as illustrated in Figure 7, while the other V groove supports a rod limit distance stop 133 which is secured to the jaw 129 by means of a bolt 132 which is threadably secured in the jaw member 129. It is seen that the groove 130 which is shown in the operating position may become worn out or burned, so that the groove and jaw would require replacement. The reversible triangular jaw 129 is removably secured in the inclined recess 134 by means of screws 135 arranged transversely through the body 128 and the jaw 129 by means of the threaded portion 139. It is only necessary to remove the screws 135, remove the jaw 129 from the recess 134, and reverse the position of the jaw to place the new groove 130 in operating position when replacing the jaw in the recess 134. It is understood that the rod stop 133 would be re-positioned in the groove other than the one in which it was fastened prior to reversing the jaw 129.

The current conducting metallic body is provided with a bore 136 formed angularly in, and located in the rear central portion; and is provided with a large communicating set screw 137. The diameter of the set screw 137 may be substantially equivalent to the diameter of the bore 136 to provide ample clamping of a welding cable placed in the bore 136. The cable 140 enters the bore so that the cable end lies at an angle to the longitudinal direction or axis of the head assembly, and is clamped by tightening the set screw 137 against the cable 140 on threads 138.

The welding cable may be attached and detached without necessitating removal of any parts of the holder due to the provision that a wrench for the set screw may be inserted through one of the lightening and cooling holes provided in the welding rod clamping handle.

The clamping handle 141 is hingedly mounted on a shaft pin 143 engaged in a section of the housing plates 115. Bushings 156 provide spacing and bearing means for the handle 141 to rotate on the shaft pin 143. The pin 143 is peened over at its ends to form flanged ends 144 for retaining the pin in position.

The clamping handle 141 is preferably made of stamped steel and formed in a curve, having a channel-shaped cross section. Openings 142 are provided for lightening and cooling. Projection 145 provides for retaining the compression spring 146, which is held at one end in recess 147 in a spring retaining insulation part 148, the reduced diameter portion 149 of which is engaged and seated in a hole 150. The spring provides for the handle to exert an inward clamping force at the forward end thereof for holding a welding rod 131 in the jaw groove 130. As in the previous embodiment, a dovetailed block 153 is held in the portion 151 of the handle 141 by means of the section 152, and holds the rivet 154 which operates into the groove 130 for holding a welding rod 131 therein.

The operation of this embodiment of the holder is substantially the same as for the previously discussed embodiment. The feature of this holder will be appreciated in the angular disposition of the cable with respect to the current conducting body 128. It is seen that if the operator tilts the head upwardly, the bend thus produced in the portion of the cable 140 between the hinge joint will only be a slight increase in the bend already formed in the cable as it enters the head in bore 136. Should the operator tilt the head downwardly, the bend in the cable will be decreased, until the cable lies substantially straight. It has been a problem of welders that consistent bending of the cable back and forth will ultimately result in damage to the cable in the form of a fracture, either of the conducting wires in the cable, or of the insulation. Should the insulation become damaged, the cable then presents a hazard to the operator. Should the wires become partially broken, all of the current flowing through the cable will be forced to be passed through less than all of the wires therein, resulting in a large degree of resistance heat generated at or near the break. Such a condition is both dangerous and uncomfortable to the operator of the holder. The feature of the cable entering the head at an angle minimizes to the greatest extent the hazards that can develop as a result of damage to the cable.

A further modification of the hinge joint (not shown) provides for the placement of a stop projection at the hinge joint to prevent the operator from bending the head upwardly with respect to the handle. In many cases of production welding, the major portion of the work can be performed with the head in the position shown in the drawings, or tilted downwardly with respect to the handle. In this instance, the cable would be caused to be straightened out as the head is tilted, thus reducing the chance for damage to occur to the cable.

As a result of the constant frictional tension of the hinge joint, the angle of the welding rod to the work may be changed at any time during welding by the operator, merely by pressing against the work with the welding rod, resulting in the frictional tension at the hinge joint being overcome so as to change the angle of the head. It will also be seen that, in this modification, the cable, the current conducting body 128, and the jaw are the only portions of the holder that are adapted to carry welding current, the other portions of the holder being completely insulated from the current. The reversible jaw provides for renewal thereof, and also for replacement thereof when both grooves eventually become worn.

Yet another embodiment of the invention resides in the construction as illustrated in Figures 11 to 16, inclusive.

As therein shown, the appearance of the holder for electrodes is slightly altered with respect to the two embodiments shown and described hereinabove. It will be seen that in the foregoing embodiments, the welding rod clamping handle appears as being on the "top" of the holder, Figures 1 and 6 illustrating the side view of the previously discussed embodiments. In the embodiment now to be described, Figure 11 illustrates a side view, the rod clamping handle being on the side of the holder not shown. In Figure 12, the holder is illustrated in plan, and in section. It is then apparent that the handle for clamping the electrode is on the side of the holder in this modification.

The tubular gripping handle 210 is similar to that shown in Figure 6, and is also provided with a pair of parallel extension plates 211 which have lightening and cooling holes 212. The plates 211 may be secured to the handle 210 by means of screws 213 or the like. Reamed holes 214 are provided for the hinge joint.

The forward hinge portion is constructed by a pair of parallel arranged housing plates, 215 and 216, each having cooling and lightening holes 218. Reamed holes 219 are provided for the hinge joint. The hinge joint is constructed in a manner similar to the joint described for the embodiment illustrated in Figure 6, and is characterized by having a flanged axle 220 having a hollow portion 221 therethrough. The axle 220 passes through the reamed holes 214 on the extension plates 211 and through the reamed holes 219 on the metallic plates 215 or 216, mounting them and hinging them together to make the hinge portion for each side. It is thus seen that the hinge joint actually comprises two point sections, one on each plate 215 and 216, leaving a space therebetween for the free movement of a current conducting cable 248. The cupped spring washers 222 mount on the outer sides of the housing plates 215 and 216; and the flanged axles 220 are peened over to provide a flange over the washers 222 and frictionally tension the washers and thus provide a constant spring tension on the double hinge joint. The housing plates 215 and 216 serve as a guard for protecting the entire forward hinged portion of the electrode holder.

Insulation strips 225 are contained within the housing formed by the plates 215 and 216. A metallic current conducting body 227 is provided within the housing, and is insulated by the strips 225 and 224. The body 227 is preferably formed from a current conducting material such as copper alloy or die cast aluminum. The body 227 is mounted by means of bolts 231 placed through transversely formed holes 230; and insulation therefor is provided in the form of insulation sleeves 232 inserted into the holes 230. In this manner, the plates 215, 216, and the current conducting body are fastened together, and are insulated from each other. The body is provided with a bore 228 for receiving and connecting therein a welding cable 248. A set screw 255 is threadably received as at portion 256 for clamping the welding cable 248 in the bore 228.

Additional insulation parts 233 are provided for insulating the top and bottom exposed portions of the current conducting body 227 and are similar in shape and form for the top or bottom. These parts 233 are secured as by screws 234. The parts 233 may be used in certain applications, but are not required except where excess welding spatter may occur during certain applications.

A rotatable welding rod jaw 237 is mounted to the body 227 by means of a tapered conical opening 236 provided in the jaw mounting section 235. The rotatable jaw 237 is preferably made of a copper alloy and has a corresponding tapered section 238 to seat into the opening 236. The jaw 237 is retained in place with spring tension means provided by a cupped spring 239 that is also retained in place by the peened-over flange portion 240 to provide a constant spring pressure. This spring pressure or tension on the rotatable jaw 237 is great enough to prevent welding current resistance heat to develop at the point of rotation, yet provides a means whereby the jaw will rotate with tension sufficient for its operation. Two or more deep V grooves 241 and 242 may be provided for holding an electrode.

A welding rod clamping handle 243 is mounted on a pivot pin 244 which is arranged on a formed bracket 245. The pivot pin 244 is peened at its ends 246 to prevent its becoming displaced from the bracket. In this manner the handle 243 is hingedly mounted on the holder.

A formed projection 247 is provided in the handle 243 to retain a compression spring 250 which exerts a force on the handle for retaining a welding rod in place. The cupped spring washer 222 retains the lower end or inner end of the spring 250 against being dislodged.

A dovetailed shaped insulation block 253 is held at portion 251 of the handle 243 and is retained in position by a pressed out section 252. A spherical shaped rivet or the like 254 is embedded in the block 253 in a manner to insulate the handle from the rivet and permit the rivet to bear against a welding rod placed in one of the V grooves.

To operate the holder, the operator grasps the tubular handle 210 with one hand in such a manner so as to squeeze the clamping handle 243 toward the handle 210, which forces the rivet 254 away from the groove 241 or 242. The operator then places a welding rod (not shown) in either groove 241 or 242 with the other hand. By releasing the clamping handle 243, the rivet 254 is brought to bear against the welding rod in the groove due to the force exerted by the spring 250 to retain the welding rod in the jaw.

When it is desired to change or vary the angle of the welding rod to the work, it is only necessary to tilt the forwardly arranged head assembly up or down on the hinge joint, any set angle being maintained by the tensioned hinge joint. It is also possible to vary the angle of the welding rod other than the adjustment made by the rod receiving and clamping hinged head assembly. Where a compound angular adjustment is desired, it is only necessary to adjust the rod by rotating the jaw 237. This is done by pushing sidewardly against the rod in any convenient manner. It is therefore seen that two independent means are provided for changing the angle of the welding rod to obviate the need for bending welding rods for the same result, with the resultant waste of rods.

The current conducting metallic body 227, the rotatable jaw 237 thereon, and the rivet 254 are the only parts that come into contact with electric current, thus completely insulating the rest of the holder from the current. It is also apparent that air freely circulates about the welding cable at all times, thus cooling the cable, and maintaining the handle at a cool temperature.

Figures 17 to 20 illustrate a further embodiment of the invention. In this embodiment, the handle 243, which is pivotally mounted at 244, does not extend as an integral part to the forward end of the holder. A rigid and preferably a spring tempered metallic extension 265 is fastened to handle 243 as by rivets 266, or other suitable means, and has a bifurcated forward end 265A in the form of a yoke-like extension. The tubular handle 210, extension plates 211, and side plates 215 and 216 are similar to the elements described for Figures 11 to 15. The clamping handle 243 is urged into rod-clamping position by means of the spring 250. An upper jaw insulator 271 comprises an upper part 267 and lower part 268, and is slidably mounted on the extension 265A of handle extension 265. The upper jaw 269 may be formed from copper or steel alloy, or the like, and is held securely by one or more screws or the like 264. The insulator 271 may be molded from a high-temperature resistant plastic or other insulating material. The corresponding inner or facing sides 270 of the insulator parts 267 and 268 are formed as grooves or the like to fit the bifurcated yoke 265A. The insulator 271 and jaw 269 are received over the yoke 265A and are held thereon by tightening the screw or screws 264 so as to insulate the yoke 265A from the current-contacting jaw 269.

It is possible to renew or replace the upper jaw 269 merely by loosening the screw 264. The parts 267 and 268 are released from engagement with the yoke 265A, permitting the operator to slide the insulator 271 and jaw 269 therefrom. The insulator 271 and jaw 269 are replaced by sliding them as a unit onto the yoke 265A and tightening the screw 264 to clamp the parts 267 and 268 securely in place on the yoke 265A. The yoke 265A forms means for insulating the handle 243 from the current by the reason that the screw 264 passes between the arms of the yoke, and does not contact any portion of the upper handle.

The current conducting body 227 is a modified form of the body according to Figures 11 to 15, and is illustrated separately in Figure 16. It is seen that the body is provided with the forward portion or jaw portion 235. The rod receiving grooves 241 are formed in both sides of the portion 235. With the body 227 in position in the holder, as shown in Figure 17, it is seen that the upper jaw engages in one set of grooves 241, forming means for holding a welding rod or electrode (not shown) in any one of several angles, due to the angular disposition of the grooves. It will also become obvious that angular adjustment of the forward hinged head assembly of the holder, as at the hinge joint, provides for a compound adjustment of the angle of the electrode to the work by forming an angular adjustment of the head assembly as well as an angular disposition of the electrode held at the jaws 235 and 269. When at any time the grooves facing the upper jaw 269 may become worn out or burned to the extent that it is no longer practical to use them for holding an electrode; the cable clamping screw 255 is loosened to permit removal of the current conducting cable 248 from the cable receiving bore 228. Screws 231 are then removed from the sides plates 215 and 216, and from the body 227. The body is removed from the position between the side plates, and is inverted, replaced in position between the side plates, and the screws 231 are tightened back in position. A new set of grooves are then in position to be engaged by the upper jaw 269 for receiving and holding a welding rod or electrode. The cable 248 is then placed in the bore 228 and is held by the screw 255 tightened thereagainst.

It will become obvious to those skilled in the art that this modification of a holder for electrodes provides for the renewal or replacement of components quickly, easily, and inexpensively, by the simple removal of the part to be renewed without necessitating the disassembly of other parts of the holder. The entire amount of current is conducted by a single member of the holder, which is fully insulated from other parts of the holder. I have therefore constructed a holder for electrodes wherein a single member of the holder is a current conducting member from the cable to the welding rod, and wherein there is provided means for renewal of such parts or portions of the holder which are subject to wear and burning.

In the several embodiments of an electrode holder, I have constructed a holder for electrodes wherein the cable enters the head assembly after passing through the handle, past the hinge joint, and thence to be clamped securely in place in the head. I have also provided for the changing of the angle of the electrode with respect to the work in a compound manner, wherein the forward hinged head assembly is adapted to be tilted with respect to the handle, and wherein the electrode may be held in one of several angular positions with respect to the electrode clamping jaw. I have also provided for the renewal of portions of the holder without the need for disassembly of the holder other than the portions being renewed. In each embodiment, the current conducting body and the upper jaw are the portions that conduct current or otherwise come into contact with the current. Other portions of the holder are completely insulated from the current conducting portions, and the entire holder is constructed in a manner whereby maximum cooling is achieved through the use of air spaces through which cooling air circulates during use of the holder. Damage to the cable due to the bending thereof is minimized by the unique manner in which the cable is connected to the current conducting portions of the holder. The cable passes through the handle, past the hinge joint, and is clamped at the head assembly. A construction at the hinge joint permits the free movement of the cable thereat, and a modification of the holder provides for clamping the cable to the head angularly to minimize the bending of the cable during the use of the holder.

It is to be understood that the invention is not to be limited to the precise forms shown and described herein, but only as fairly falls within the scope of the appended claims.

I claim:

1. In an electrode holder having a rod gripping head assembly for holding an electrode, and a handle, said rod gripping head assembly being hingedly attached to said handle at a hinge joint, said rod gripping head assembly being adapted to tilt, said handle being hollow, said head assembly being adapted to clamp an electrical conductor cable, said cable passing through said gripping handle and past said hinge joint and being fastened to said head assembly.

2. In an electrode holder having a rod gripping head assembly for holding an electrode and a handle, said rod gripping head assembly being hingedly attached to said handle at a hinge joint, said handle being a tubular handle, said rod gripping head assembly being adapted to tilt, said head assembly being adapted to clamp an electrical conductor cable, said cable passing through said gripping handle and past said hinge joint and being fastened to said head assembly.

3. In an electrode holder having a rod gripping head assembly for holding an electrode and a handle, said rod gripping head assembly being hingedly attached to said handle at a hinge joint, said handle being a tubular handle, said rod gripping head assembly being adapted to tilt to either side of said gripping handle, said head assembly being adapted to clamp an electrical conductor cable, said cable passing through said gripping handle and past said hinge joint and being fastened to said head assembly.

4. In an electrode holder according to claim 1, said hinge joint being a spring tensioned hinge joint having friction discs and spring washers on shafts, said gripping handle being partially slotted having parallel portions extending therefrom, said rod gripping head having parallel side plates extending therefrom, said shafts passing through said side plates and through said portions, said spring washers being interposed between said side plates and a nut engaged on said shafts for forming said hinge joint, whereby said rod gripping head is adapted to be rotated on said studs up or down from said gripping handle.

5. In an electrode holder according to claim 3, said hinge joint being a cupped spring tensioned double hinge joint having metallic friction discs and cupped metallic spring washers on stud shafts, said gripping handle being tubular and partially slotted having parallel metallic portions extending therefrom, said rod gripping head having parallel metallic side plates extending therefrom, said stud shafts passing through said metallic side plates and through said metallic portions, said cupped spring washers being interposed between said side plates and a nut threadably engaged on said stud shafts for forming said tensioned double hinge joint, said nuts being adapted to be tightened for adjusting tension on said joint, whereby said rod gripping head is adapted to be rotated on said studs up or down from said gripping handle.

6. In an electrode holder having an electrode clamping head, a slotted handle having extension plates hinged to said electrode clamping head at a hinge joint, said electrode clamping head having a clamping means for directly engaging an electrical conductor cable extending through said handle and past said hinge joint.

7. In an electrode holder according to claim 6, said electrode clamping head being completely insulated from said extension plates and having an air space therebetween, said conductor cable being connected only to said electrode clamping head whereby all other parts being insulated from said head, said holder is adapted to operate in a cool manner.

8. An electrode holder having a rod gripping head assembly for holding an electrode, and a handle, said rod gripping head assembly being hingedly attached to said handle at a hinge joint, said rod gripping head assembly being adapted to tilt with respect to said handle, said head assembly being adapted to clamp an electrical conductor cable, said cable passing through said gripping handle and past said hinge joint and being fastened to said head assembly, said cable entering said head assembly at an angle.

9. An electrode holder according to claim 8, a recess formed angularly in said head assembly, a jaw member having at least one rod receiving groove formed therein removably secured in said recess, whereby said jaw member is adapted to be reversed in said recess.

10. An electrode holder having a rod gripping head assembly for holding an electrode, and a handle, said rod gripping head assembly being hingedly attached to said handle at a hinge joint, said rod gripping head assembly being adapted to tilt with respect to said handle, said head assembly being adapted to clamp an electrical conductor cable, said cable passing through said gripping handle and past said hinge joint and being fastened to said head assembly, a recess formed angularly in said head assembly, a jaw member having at least one rod receiving groove formed therein and being removably secured in said recess, whereby said jaw member is adapted to be reversed in said recess.

11. An electrode holder having a rod gripping head assembly for holding an electrode, and a handle, said rod gripping head assembly being hingedly attached to said handle at a hinge joint, said rod gripping head assembly being adapted to tilt, said head assembly being adapted to clamp an electrical conductor cable, said cable passing through said gripping handle and past said hinge joint and being fastened to said head assembly, a current conducting body in said head assembly, a rotatable jaw member mounted on said current conducting body, means providing spring tension on said rotatable jaw member, whereby said jaw member is adapted to be rotated against the urging of said spring tension means.

12. An electrode holder having a rod gripping head assembly for holding an electrode, and a handle, said rod gripping head assembly being hingedly attached to said handle at a hinge joint, said rod gripping head assembly being adapted to tilt, said head assembly being adapted to clamp an electrical conductor cable, said cable passing through said gripping handle and past said hinge joint and being fastened to said head assembly, a current conducting body in said head assembly, a jaw portion extending from said current conducting body, rod receiving grooves formed on more than one side of said jaw portion, whereby said current conducting body is adapted to be changed with respect to position in said head assembly for renewing said jaw portion.

13. In an electrode holder including a gripping handle, a rod gripping head assembly, and a rod clamping handle; a jaw insulator comprising an upper part and a lower part, an extension on one end of said clamping handle, a jaw fastened to said insulator, said insulator and jaw thereon being slidably fastened to said extension, and means for securely fastening said insulator and said jaw on said extension.

14. In an electrode holder including a gripping handle, a rod gripping head assembly, and a rod clamping handle; an extension on one end of said clamping handle, said extension having a yoke formed therein, an insulator comprising an upper part and a lower part, the corresponding sides of each said part being formed to fit said yoke, a jaw fastened to said insulator, said insulator and said jaw being received on said yoke, and means for releasably securing said insulator and said jaw on said yoke.

15. An electrode holder having a rod gripping head assembly for holding an electrode, and a handle; said head assembly being attached to said handle at a hinge joint, said head assembly being adapted to tilt, said head assembly being adapted to clamp an electrical conductor cable, said cable passing past said hinge joint and being fastened to said head assembly.

16. An electrode holder having a rod gripping head assembly and a handle; said head assembly being hingedly attached to said handle at a hinge joint, said handle being hollow, said head assembly being adapted to receive an electrical conductor cable, said cable passing through said handle, past said hinge joint and being fastened to said head assembly.

References Cited in the file of this patent

UNITED STATES PATENTS

| | | |
|---|---|---|
| 1,301,347 | Williams | Apr. 22, 1919 |
| 1,313,572 | Baker et al. | Aug. 19, 1919 |
| 2,174,809 | Varner | Oct. 3, 1939 |
| 2,243,368 | Aiken | May 27, 1941 |
| 2,350,426 | Thompson | June 6, 1944 |
| 2,371,649 | Radabaugh | Mar. 20, 1945 |
| 2,373,605 | Shellabarger | Apr. 10, 1945 |
| 2,402,535 | Cushman | June 25, 1946 |
| 2,411,652 | Garibay | Nov. 26, 1946 |
| 2,412,492 | Brazitis | Dec. 10, 1946 |
| 2,455,108 | Beauregard | Nov. 30, 1948 |